UNITED STATES PATENT OFFICE.

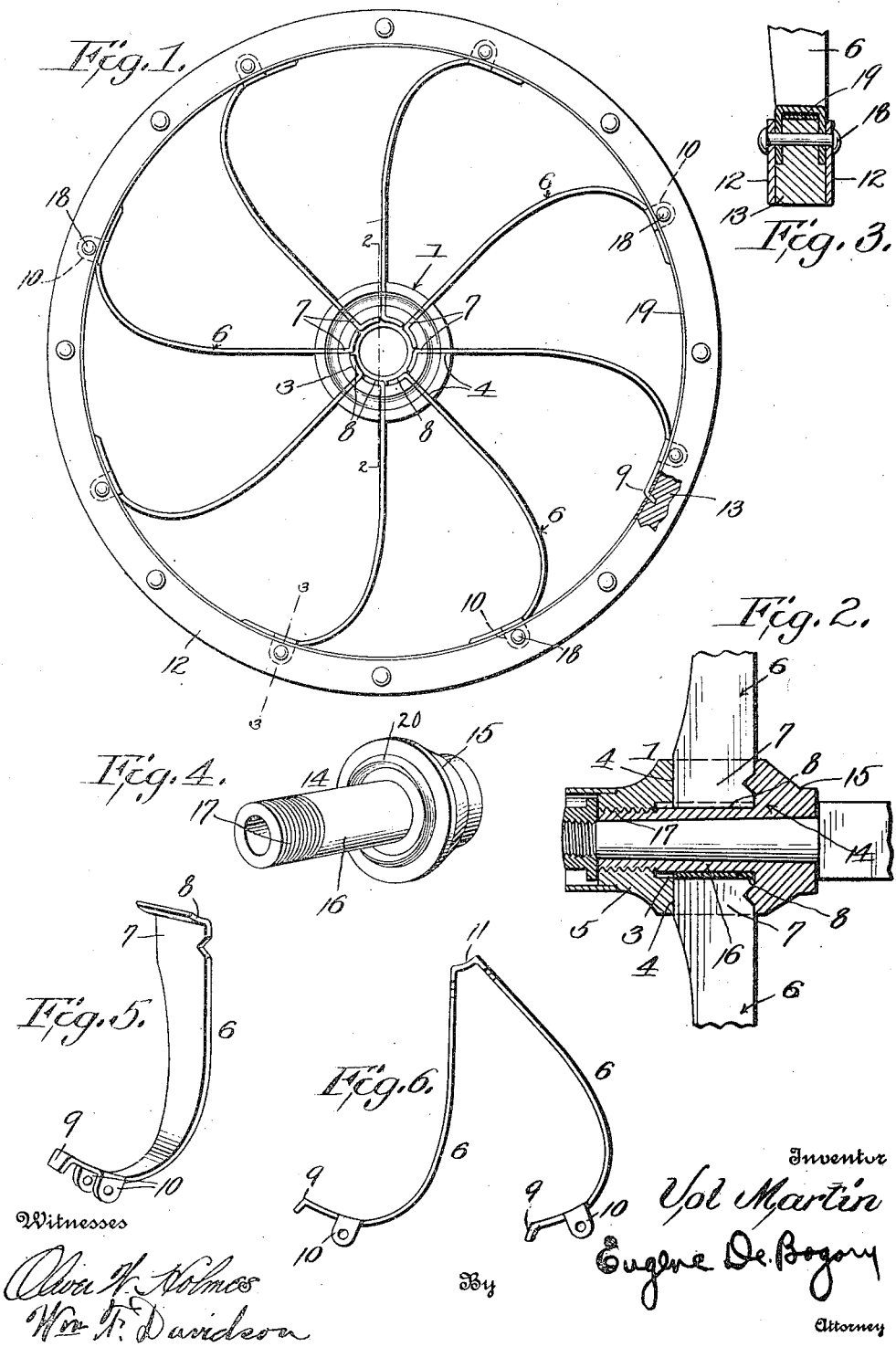

VOL MARTIN, OF ABILENE, TEXAS.

SPRING-WHEEL.

1,069,624.  Specification of Letters Patent.  Patented Aug. 5, 1913.

Application filed February 1, 1911. Serial No. 605,978.

*To all whom it may concern:*

Be it known that I, VOL MARTIN, a citizen of the United States, residing at Abilene, in the county of Taylor and State of Texas, have invented certain new and useful Improvements in Spring-Wheels, of which the following is a specification.

This invention relates to vehicle wheels and more particularly to that class of wheels in which spring-spokes are utilized to provide resilience therein for utility in line of the usual vehicle-springs; and the invention consists in features of novelty hereinafter fully described, and pointed out in the claims.

In the accompanying drawings illustrating my invention, Figure 1 is a side view of my improved wheel with parts broken away. Fig. 2 is an enlarged detail cross sectional view on the line 2—2 Fig. 1. Fig. 3 is a cross sectional view taken on the line 3—3 Fig. 1. Fig. 4 is a detail perspective of the spindle member. Fig. 5 is a perspective view of one of the spokes removed. Fig. 6 is a side elevation of a modification of one of the spokes removed.

Referring more specifically to the drawings 1 designates the hub of the wheel, preferably of metal, centrally bored at 3 and provided with a plurality of slots 4 radiating from the bore 3. The slots 4 which are comparatively narrow have their inner ends terminating adjacent the outer end 5 of the hub.

6 designates flat spring-spokes, the widened inner ends 7 of which are slightly curved (see Figs. 1 and 5) as at 8. The outer ends of the springs terminate in a downwardly projecting prong 9 and a short distance from the prong 9 are a pair of apertured ears 10. In Fig. 6 I have illustrated a modified form of spoke in which it will be seen that the spokes are made in pairs integrally connected at their inner ends by the curved web 11.

12 designates a pair of metallic rings or side plates preferably flat in cross section having secured therebetween the body or tread portion 13, the latter of which being formed of rubber or any other desirable material. A suitable rim 19 is also provided.

The inner ends of the spokes are secured within the slots 4 and the curved extremities thereof lie within and conform to the walls of the bore 3. A boxing 14 has a cap 15 on one end adapted to engage the outer side edges of the spokes, and an annular extending flange 20 forming a securing means for the spokes and prevent any longitudinal and vertical movement of the above mentioned spokes, and a hollow spindle 16 adapted to extend through the bore 3 to form a bearing for one end of an axle (not shown). The spindle is externally screw-threaded at 17 to engage threaded inner end of the bore 3.

As hereinbefore stated the outer ends of the spokes are provided with a prong 9 and a pair of apertured ears 10, the former being adapted to be forced into the inner, or rim portion of the tread member 13, and the latter adapted to engage between the rings 12 and the tread portion. Pins 18 passing transversely through the rings 12 apertured ears 10 and tread portion 13 securely connect these parts together.

From the foregoing it will be seen that the spokes 6 are securely clamped within the hub 1 and at the same time are readily interchangeable. To detach a spoke, or pair of spokes, (according to which form is used) it is merely necessary to unscrew the cap 15, and remove the pins 18, whereupon the spokes may be withdrawn from the slots 4.

Having thus described my invention, what I claim is:

A wheel comprising a hub, said hub having an annular flange forming a securing means for the spokes, said spokes having their inner ends curved to correspond with a curvature of the hub, the outer ends provided with outwardly extending tongues and outwardly extending flanges forming fastening means for securing the spokes to the rim.

In testimony whereof I affix my signature in presence of two witnesses.

VOL MARTIN.

Witnesses:
G. N. PORTER,
G. O. COZORT.